US012625084B2

(12) United States Patent     (10) Patent No.:   US 12,625,084 B2

Melandri et al.     (45) Date of Patent:    May 12, 2026

(54) PACKAGE QUALITY INSPECTION STATION AND A METHOD FOR INSPECTING QUALITY OF A PACKAGE

(71) Applicant: Tetra Laval Holdings & Finance S.A., Pully (CH)

(72) Inventors: Antonio Melandri, Rubiera (IT); Paolo Scarabelli, Reggio Emilia (IT); Massimo Viola, Marano sul Panaro (IT); Renzo Bellei, Modena (IT); Francesco Panini, Formigine (IT); Mattia Verasani, San Martino in Rio (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 97 days.

(21) Appl. No.: 18/571,634

(22) PCT Filed: May 4, 2022

(86) PCT No.: PCT/EP2022/061979
§ 371 (c)(1),
(2) Date: Dec. 18, 2023

(87) PCT Pub. No.: WO2022/263051
PCT Pub. Date: Dec. 22, 2022

(65) Prior Publication Data
US 2024/0288378 A1     Aug. 29, 2024

(30) Foreign Application Priority Data
Jun. 18, 2021    (EP) ..................................... 21180220

(51) Int. Cl.
*G01N 21/90*     (2006.01)
*G01N 21/84*     (2006.01)

(52) U.S. Cl.
CPC ....... *G01N 21/90* (2013.01); *G01N 2021/845* (2013.01)

(58) Field of Classification Search
CPC ........ G01N 21/89; G01N 21/90; G01N 21/01; G01N 21/00; G01N 25/72; G01N 35/04; G01N 35/02
See application file for complete search history.

(56) References Cited

U.S. PATENT DOCUMENTS 6,158,193 A    12/2000   Focke et al.
2016/0305871 A1*   10/2016   Gerst, III ........... G01N 21/8806
(Continued)

FOREIGN PATENT DOCUMENTS

DE    102008062370 A1    6/2010
JP     H05-81697 U    11/1993
TW     M542139 U    5/2017

OTHER PUBLICATIONS

Malesa et al. "Quality Control of PET Bottles Caps with Dedicated Image Calibration and Deep Neural Networks", Jan. 12, 2021, MDPI, Sensors, 21, 501, pp. 1-16. (Year: 2021).*
(Continued)

*Primary Examiner* — Kara E. Geisel
(74) *Attorney, Agent, or Firm* — Knobbe Martens Olson & Bear LLP

(57) ABSTRACT

A package quality inspection station (100) is provided. The station (100) comprises a first conveyor belt (102) and a second conveyor belt (108) arranged to abut a bottom portion (104) of a package (106). The second conveyor belt (108) is placed at distance (D) from the first conveyor belt (102) such that a gap (110) is formed. A belt brake (112) comprising a first and a second lateral belt arrangement (114, 116) arranged to hold the package (106) is provided to bridge the gap (110) and to hold the package (106) such that a top portion (160) and the bottom portion (104) are made (Continued)

visible when conveyed over the gap (110). A top camera (132) is configured to capture top image data (134) depicting the top portion (160), and a bottom camera (136) configured to capture bottom image data (138) depicting the bottom portion (104). A controller (142) can be configured to receive the top image data (134) and the bottom image data (138) and to identify quality issues linked to the package (106) based on the top image data (134) and the bottom image data (138) in combination.

12 Claims, 3 Drawing Sheets

(56) References Cited

U.S. PATENT DOCUMENTS

2018/0025487 A1* 1/2018 Macdonald ............... B07C 3/08
348/91

2019/0238796 A1* 8/2019 Allen ...................... H04N 7/181
2021/0170452 A1* 6/2021 Schmidt ................. G01N 21/27

OTHER PUBLICATIONS

Bahaghighat et al. "Vision Inspection of Bottle Caps in Drink Factories Using Convolutional Neural Networks" 2019, IEEE, 978-1-7281-4914-1/19, pp. 381-385 (Year: 2019).*
Kjetil Kveim, "Plastic Bottle Cap Detection" 2019, University of Oslo, pp. 1-77 (Year: 2019).*
Translation of JP 2003276831 A (Year: 2003).*
International Search Report and Written Opinion received in PCT Application No. PCT/EP2022/061979 as mailed Sep. 8, 2022 in 9 pages.

* cited by examiner

200

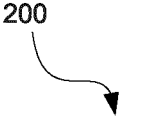

| Transporting package on first conveyor belt | 202 |

| Handing over from first conveyor belt to belt brake | 204 |

| Transorting over gap using belt brake | 206 |

| Capturing top image data | 208 |

| Capturing bottom image data | 210 |

| Handing over from belt brake to second conveyor belt | 212 |

| Transporting package on second conveyor belt | 214 |

| Feeding top image data and bottom image data to controller | 216 |

| Identifying quality issues based on top image data and bottom image data in combination | 218 |

*Fig. 4*

PACKAGE QUALITY INSPECTION STATION AND A METHOD FOR INSPECTING QUALITY OF A PACKAGE

TECHNICAL FIELD

The invention generally relates to food packaging, more specifically it is related to a package quality inspection station and a method for inspecting quality of a package.

BACKGROUND ART

Today it is common practice within the packaging industry to continuously assess quality of packages being produced. In its most simple form, this may be achieved by that personnel is assessing the quality of sample packages. Even though this has proven to be a reliable method for assessing quality in some cases, there is a risk that different persons make different assessments for identical quality issues, and thus as an effect that the reliability of the quality assessment can sometimes be questioned.

To overcome the risks involved with manual quality assessment, automatic quality assessment can be an option. Instead of having personnel assessing the packages, an automatic quality station may comprise a camera for capturing image data depicting the package, and a controller configured to assess the image data such that deviations linked to a specific package can be detected. For instance, in case a cap is not applied correctly compared to other packages, in which the cap application process is confirmed to be made according to pre-set quality standards, this may be detected by the automatic quality station and a notification can be sent to an operator. Once receiving the notification, the operator can make a manual quality inspection and/or look into the cap application process to make sure that this is working adequately.

Even though the camera-based quality control stations available today are improving consistency of the quality control of packages, there is still a need for even better quality control stations such that quality issues can be detected quicker and also with improved reliability. The positive effect of detecting deviations earlier and also with improved reliability is that costs can be lowered. In other words, by making it is possible to detect inadequate packages sooner, fewer packages need to be discarded. Since less food is wasted with improved quality control, improved quality control stations also have a positive effect on the CO2 footprint.

The patent document TWM542139U discloses an image data based inspection system provided with several cameras for inspecting the bottles while being transported on conveying units.

The patent document U.S. Pat. No. 6,158,193A discloses a system for checking packages, particularly cigarette packs, by using cameras such that defective packs can be sorted out.

SUMMARY

It is an object of the invention to at least partly overcome one or more of the above-identified limitations of the prior art. In particular, it is an object to provide a quality control inspection station that can quickly and reliably can detect quality issues in packages, such as carton packages.

According to a first aspect it is provided a package quality inspection station comprising a first conveyor belt arranged to abut a bottom portion of a package while being conveyed along a transportation path, a second conveyor belt arranged to abut the bottom portion of the package while being conveyed along the transportation path, wherein the second conveyor belt may be placed at distance from the first conveyor belt such that a gap is formed, a belt brake comprising a first and a second lateral belt arrangement arranged to hold the package via a first and a second lateral section of the package while being conveyed along the transportation path, wherein in a first conveyor section of the transportation path the package may be solely conveyed by the first conveyor belt, in a first hand-over section of the transportation path the package may be conveyed by the first conveyor belt in combination with the belt brake, in a belt brake section of the transportation path the package may be conveyed by the belt brake solely, in a second hand-over section of the transportation path the package may be conveyed by the belt brake in combination with the second conveyor belt, and in a second conveyor section of the transportation path the package may be solely conveyed by the second conveyor belt, a top camera configured to capture top image data depicting a top portion of the package, wherein the top camera may be placed above the transportation path, a bottom camera configured to capture bottom image data depicting a bottom portion of the package, wherein the bottom camera may be placed below the belt brake section and in the gap between the first and second conveyor belt, and a controller configured to receive the top image data and the bottom image data and to identify quality issues linked to the package based on the top image data and the bottom image data in combination.

An advantage of having the gap and the belt brake holding the package is that it is made possible to capture the top image data and the bottom image data at the same time or within a short time span, such as within an interval of three seconds, more preferably within one second. As an effect, this provides the possibility to assess the top portion and the bottom portion simultaneously. For carton packages, formed from a blank or a web, this is advantageous since a misalignment in the top portion may lead to misalignments also in the bottom portion and vice versa.

Put differently, the belt brake can provide for that the package can be held such that the top and the bottom of the package can be made accessible to the top and bottom camera, respectively. As described above, this is made possible by that the belt brake comprises the first and second lateral belt arrangement which together can hold the package by interacting with the side sections of the package. Thus, the belt brake is herein not necessarily used for reducing speed of packages fed via a conveyor belt, but to hold the package such that the top and bottom of the package are in the field of view of the top and bottom camera, respectively.

As described above, packages formed from the web or from the blank may benefit from the quality inspection system presented above. Some quality issues related to such packages are namely likely to be found in both the top and bottom of the package. For instance, in case the folding of the package is made such that top flaps of the package are not aligned, this may also result in that bottom laps of the package are not aligned. This is related to that the package is folded from a rectangular piece of packaging material or any other pre-set shape of packaging material. In other words, since top features are linked to bottom features, and vice versa, it has been found beneficial to identify quality issues of the package by using the top and bottom image data in combination, i.e. two assess the two sets of image data with the knowledge that the two sets relate to the same package. By doing so, the models, e.g. statistical models or AI/ML (Artificial Intelligence/Machine Learning) based models, may take this into account with the positive effect that more reliable quality inspection can be made.

Since some packages, e.g. carton packages, may be deformed such that the top features and/or the bottom features are affected, it is beneficial to provide for that the top image data and the bottom image data are captured simultaneously or, if not possible to achieve simultaneous capturing, at least within a short time span, e.g. less than three seconds. By reducing a time difference between a time of capturing the top image data and a time of capturing the bottom image data, there is less risk of having the top and/or bottom affected in any way between the time points of capturing the two different image data sets. Thus, by having the two image data sets captured within a short time span or simultaneously, correlations between the top features and the bottom features can be determined more reliably.

The top camera may be placed vertically above the bottom camera.

A photocell may be provided upstream the top camera and/or the bottom camera in the transportation path such that the photocell may trigger capturing of the top image data using the top camera and/or capturing of the bottom image data using the bottom camera.

The controller may comprise a text recognition module configured to transform a text comprised in the top image data into a text data set.

The controller may further comprise an identification code recognition module configured to transform an identification code depicted in the top image data into an identification data set.

Being able to link an identification data set to the package has the advantage that the identification of quality issues in the controller may benefit from other information linked to the package, e.g. machine data, i.e. settings used in the filling machine, also referred to as packaging machine, used when producing the package.

The controller may further comprise a top forming assessment module configured to assess top features, such as top flaps, provided on the top portion of the package depicted in the top image data.

The controller may further comprise a bottom features assessment module configured to assess bottom features, such as bottom flaps, provided on the bottom portion of the package depicted in the bottom image data.

The top features assessment module may be configured to feed top features assessment data to the bottom features assessment module, and the bottom features assessment module may be arranged to assess the bottom features based on the bottom image data in combination with the top features assessment data.

The controller may further comprise a data communications module configured to transfer the identification data set, the top image data, the bottom image data of the package to a database on a server, wherein the server may be further configured to receive operator features assessment data and the identification data set from an operator panel and to link the operator features assessment data to the top image data and the bottom image data via the identification data set, wherein the operator features assessment data may specify whether or not the package meets features quality requirements with respect to the top features, such that a combination of the top image data, the bottom image data and the operator features assessment data may be used as features training data for an artificial intelligence engine used by the top features assessment module and/or the bottom features assessment module.

By combining the top image data and the bottom image data with the operator features assessment, automatically captured data can be efficiently combined with manual quality assessment data. An advantage of this is that data from different sources can be used by e.g. an AI engine, which as an effect can result in that more reliable quality inspection can be achieved.

The top camera may be a 3D camera arrangement generating 3D cap image data, and the controller may comprise a cap application assessment module configured to assess a cap applied on the top portion of the package depicted in the top image data.

The data communications module may be configured to transfer the 3D cap image data to the database on the server, wherein the server may further be configured to receive operator cap assessment data from the operator panel and to link the operator cap assessment data to the 3D cap image data, wherein the operator cap assessment data specifies whether or not an application of the cap onto the package meets cap application quality requirements, such that a combination of the 3D cap image data and the operator cap assessment data may be used as cap application training data for an AI engine used by the cap application assessment module.

According to a second aspect it is provided a method for quality inspection of a package, said method comprising transporting the package on a first conveyor belt along a transportation path by having the package placed on the first conveyor belt such that a bottom portion of the package may be resting on the first conveyor belt, handing over the package from the first conveyor belt to a belt brake, comprising a first and a second lateral belt arrangement, by transporting the package along the transportation path by having the bottom portion resting on the first conveyor belt and a first and a second lateral section of the package interacting with the first and a second lateral belt arrangement, respectively, transporting the package over a gap formed between the first conveyor belt and a second conveyor belt placed downstream the first conveyor belt in the transportation path by having the package interacting with the first and second belt arrangement, capturing top image data depicting a top portion of the package using a top camera during the step of transporting the package over the gap, capturing bottom image data depicting a bottom portion of the package using a bottom camera during the step of transporting the package over the gap, handing over the package from the belt brake to a second conveyor belt by transporting the package along the transportation path by having the bottom portion resting on the second conveyor belt and the first and a second lateral section of the package interacting with the first and the second lateral belt arrangement, respectively, transporting the package on the second conveyor belt along the transportation path by having the package placed on the second conveyor belt such that the bottom portion of the package may be resting on the second conveyor belt, feeding the top image data and the bottom image data to a controller, and identifying, using the controller, quality issues linked to the package based on the top image data and the bottom image data in combination.

The features and advantages discussed in relation to the first aspect also apply to this second aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1A generally illustrates a side view of a package quality inspection station.

FIG. 4 is a flowchart illustrating a method for quality inspection of the package.

DETAILED DESCRIPTION

Figures 1A, 1B:
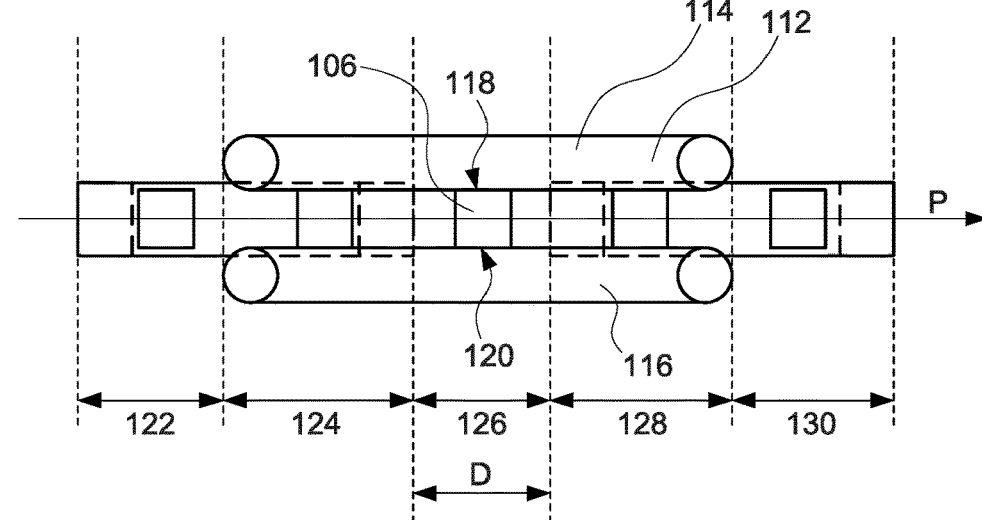
FIG. 1B generally illustrates the package quality inspection station from above.

With reference to FIGS. 1A and 1B, by way of example, a package quality inspection station 100 is illustrated. FIG. 1A illustrates a side view of the package quality inspection station 100, and FIG. 1B illustrates a top view of the same.

The package quality inspection station 100 can comprise a first conveyor belt 102 arranged to interact with a bottom portion 104 of a package 106. As illustrated, the first conveyor belt 104 may be belt-driven, but other technologies for transporting the package 106 along a transportation path P may also be used. Downstream the first conveyor belt 104, a second conveyor belt 108 can be provided. The first and second conveyor belt 102, 108 can be placed at a distance D from each other such that a gap 110 is formed. To transport the package 106 over the gap 110, a belt brake 112 can be used. This can comprise a first and a second lateral belt arrangement 114, 116 between which the package 106 can be held. More particularly, the package 106 can be held by the belt brake 112 by that a first lateral section 118 of the package 106, such as a first side panel, interacts with the first lateral belt arrangement 114 at the same time as a second lateral section 120 of the package 106, such as a second side panel, interacts with the second lateral belt arrangement 116. Put differently, the package 106 can be clamped between the first and second lateral belt arrangement 114, 116 such that the package 106 can be lifted over the gap 110.

To assure a smooth transition from the first conveyor belt 102 to the belt brake 110, and from the belt brake 110 to the second conveyor belt 108, the belt brake 110 may extend over the first conveyor belt 102 as well as the second conveyor belt 108. Put differently, as illustrated, in a first conveyor section 122, the package 106 can be placed on the first conveyor belt 102 without interaction with the belt brake 110. In a first hand-over section 124, placed downstream the first conveyor section 122, the package 106 can come in contact with the belt brake 110 such that the bottom portion 104 of the package 106 can be in contact with the first conveyor belt 102 and the first and second lateral section 118, 120 of the package 106 can be in contact with the first and second lateral section 118, 120, respectively. Next, in a belt brake section 126, placed downstream the first hand-over section 124, the package 106 can be held solely by the belt brake 112, more particularly the first and second lateral belt arrangement 114, 116, thereby providing for that the bottom portion 104 of the package 106 is made visible from below.

To assure that the package 106 can be transferred from the belt brake 112 to the second conveyor belt 108 smoothly and securely, a second hand-over section 128 can be provided. In this section, the package 106 can be held by the belt brake 112 in combination with being placed on the second conveyor belt 108. Downstream the second hand-over section 128, a second conveyor section 130 can be provided. In this second conveyor section 130 the package 106 is solely transported by the second conveyor belt 108.

Figures 2, 3:
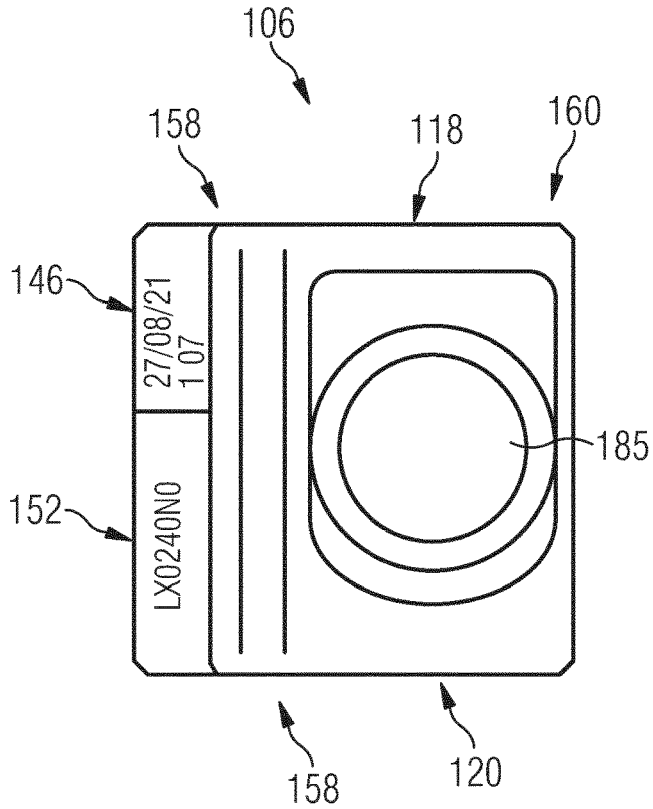
FIG. 2 illustrates a top view of a package.
FIG. 3 illustrates a bottom view of the package.

When provided in the belt brake section 126, the package 106, more particularly a top portion 160 of the package 106, as illustrated in further detail in FIG. 2, may be placed in a field of view of a top camera 132 such that top image data 134 can be generated. The top image data 134 may be two dimensional image data, but it may also be three dimensional image data. In case of the latter, an additional camera 133 camera may be used. However, since a speed of the belt brake may be known, it is also possible to form three dimensional image data by using the top camera 132 for capturing image data at different points of time and, by making use of the known speed of the belt brake 112, combining the image data from different time points into three dimensional image data.

The top camera 132 and the additional top camera 133 may be configured in a similar manner, but they may also differ in that the they—by way of example—are configured to capture light with different spectral properties, i.e. having different filters and/or image sensors configured for capturing light of different spectral properties. Further, as illustrated, the top camera 132 and the additional top camera 133 may be tilted differently, thereby providing for that e.g. reflections on the package 106 are depicted differently in the image data generated by the top camera 132 compared to the additional top camera 133. As illustrated, the top camera 132 may be tilted with an angle α and the additional top camera 133 may be tilted with an angle β, where the angle β is greater than the angle α. Further, a top lighting device 135 may be used for providing conditions for the top camera 132 and optionally the additional top camera 133 to generate the top image data 134 that can be used as a basis for making reliable quality assessment.

A bottom camera 136 may placed below the belt brake section 126. Since the package 106 is held solely by the belt brake 112 and the bottom portion 104 is hence not resting on neither the first conveyor belt 102, nor the second conveyor belt 108, it is made possible to capture bottom image data 138 depicting the bottom portion 104 of the package 106. An advantage of having the bottom camera 136 as well as the top camera 132, and optionally the additional top camera 133, placed in the same section is that the package 106 has the same condition when assessing the top portion 160 and the bottom portion 104. Having the possibility of assessing these two at approximately the same time comes with the benefit that dents in side panels or other quality issues that may be seen in the top portion and the bottom portion, even though not necessarily directly affecting these portions, may be easier to detect compared to a situation when the top portion 160 and the bottom portion 104 are assessed at different points of time. The risk of assessing the top portion 160 and the bottom portion 104 at different points of time is namely that the package 106 has been affected between these two different points of time and hence that the conditions of the package are not the same. Further, to provide conditions increasing the possibilities to achieve the bottom image data 134 such that this can be used as a basis for the quality assessment, a bottom lighting device 139 can be used.

As illustrated, in addition, a photocell 140 can be provided upstream the top camera 132 and the bottom camera 136, thereby making it possible to trigger capturing of the top image data 134 and the bottom image data 138 by sending a triggering signal to the top camera 132, and optionally the additional top camera 133, as well as the bottom camera 136. Since the distance between the photocell 140 and the top camera 132 and the bottom camera 136 as well as the speed of the first conveyor belt 102, the belt brake 112 and the second conveyor belt 108 can be known, the top camera 135 and the bottom camera 136 can be tuned such that the top image data 134 and the bottom image data 138 can be captured at a time when the package 106 is placed in a position of the transportation path P for which the top camera 135 and the bottom camera 136 are configured. Even though the photocell 140 is mentioned as an example, this is to be seen as an one way of triggering image capturing and other technologies fulfilling the task of detecting the package 106 may also be used as an alternative to the photocell 140.

Data generated by the top camera 132 and the bottom camera 136 may be fed to a controller 142. This may be any data processing device capable of handling the data and it may be single unit or embodied by multiple units. The controller 142 may comprise a text recognition module 144 configured to receive the top image data 134 and to transform text 146 on the package 106 depicted in the top image data 134 into a text data set.

The controller 142 may further comprise an identification code recognition module 150 configured to receive an identification code 152, such as a QR code printed on the top portion 160 of the package 106, via the top image data 134. Based on the identification code 152, an identification data set 154 can be determined. For example, the identification code 152 may be embodied as the QR code or a code consisting of a combination of letters and numbers, as illustrated in FIG. 2. In the identification code recognition module 150, this code depicted in the top image data 134 can be interpreted and transformed into the identification data set 154, which may be in the form of a number. Due to the fact that the identification data set 154 may be in the form of the number, the identification data set 154 can easily be compared with other data and also be stored efficiently.

Further, the controller 142 may comprise a top forming assessment module 156 configured to receive the top image data 134 in which top features 158 are depicted. Based on the top image data 134, positions, dents etc. on the top features 158, herein illustrated as top flaps, may be identified, and if the positions, the dents etc. are to be considered as deviations from quality standards, these may be determined to be quality issues. As will be described further below, the quality standards may be based on data collected from previously assessed packages.

Since also the bottom image data 138 can be available, a bottom forming assessment module 162 can also be provided. In the bottom image data 138, bottom features 164, illustrated in FIG. 3, may be depicted, and similar to the top forming assessment module 156, the bottom forming assessment module 162 may be configured to detect deviations compared to the quality standards in view of the bottom features 164. As for the top forming assessment module 156, the bottom forming assessment module 162 may compare the bottom features 164 of a sample package, i.e. a package being assessed, with previously assessed packages confirmed to meet the quality standards.

The assessment of the top features 158 and the bottom features 164 can be interrelated, in particular in case the package 106 is a carton package produced by a roll-fed packaging machine as illustrated in FIGS. 2 and 3. Having the package 106 produced by the roll-fed packaging machine comes namely with that a misalignment in one end of the package 106, e.g. the top portion 160, may result in that a misalignment also occurs in the other end, e.g. the bottom portion 104. To provide for that the assessment made in view of the top features may be used when assessing the bottom features, top features assessment data 166 may be transferred from the top forming assessment module 156 to the bottom forming assessment module 162. Even though not illustrated, the opposite may also be an option, that is, transferring bottom features assessment data from the bottom features assessment module 162 to the top features assessment module 156. By sharing data in this way, the reliability of the quality assessment may be further improved, an interrelationship between the top portion 160 and the bottom portion 104 not considered in quality inspection stations of today are taken into account.

Thus, based on the relationships between the top and the bottom of the package 106, when identifying quality issues of the package 106, the top and bottom image data 134, 138 can be assessed in combination. Put differently, it is during the assessment taken into account that the two sets of image data relate to the same package 106 and for this reason that a quality issue in the top portion 160 may be correlated to a quality issue in the bottom portion 104.

The controller 142 may comprise a data communications module 170. An advantage with having this module is that data may be exchanged with other devices, thereby making it possible to make use of information from a large number of different package quality inspection stations 100. To further improve the quality assessment, information gathered via an operator panel 174 may also be taken into account. For instance, the top image data 134, the bottom image data 138 and the identification data set 154 may be transferred by using the data communications module 170 from the controller 142 to a server 176 comprising a database 178. In parallel, operator top features assessment data 172, that is, data related to assessment of the top features 158 made by an operator and the identification data set 154 may be transferred from the operator panel 174 to the server 176 and the database 178. Since the identification data set 154 is provided both via the controller 142 and the operator panel 174, the operator features assessment data 172 may be linked to the top image data 134 and the bottom image data 138 provided via the controller 142. By having the possibility to link data provided via the controller 142 and the operator panel 174, the database 178 may comprise not only automatically captured data, but also manually captured data. An advantage of having data captured via both the top camera 132 and the bottom camera 136 as well as from the operator panel 174 is that different aspects of the package 106 may be covered and an improved basis for further analysis may be formed. By using an AI engine 180, such as a neural network, the data fed to the server 176 in combination with a quality approval or quality disapproval, i.e. data saying that the package 106 meets or does not meet the quality standards, which may be fed to the server 176 from the operator panel 174, may be used for continuously improving models used for assessing the top features 158 and/or the bottom features 164 as well as other parts of the package 106.

In case the package 106 is provided with a cap 185, the top camera may be a 3D camera arrangement generating 3D cap image data 182. The 3D cap image data 182 may be transferred to a cap application assessment module 184 on the controller 142 in which application of the cap 185 is assessed, e.g. it can be assessed if the cap is applied in an assigned area of the top portion of the package. The 3D cap image data 182 may also be transferred from the controller 142 to the server 176. In addition, the application of the cap may be assessed by the operator and via the operator panel 174, operator cap assessment data 186 may be transferred to the server 176 such that the AI engine 180 may also be trained by the 3D cap image data 182 and the operator cap assessment data 186.

FIG. 2 illustrates by way of example the package 106 embodied as a brick-shaped carton package. As illustrated, the package 106 may comprise a first side panel forming the first lateral section 118 and a second side panel forming the second lateral section 120. In this particular example, the top features 158, illustrated herein as the top flaps, are folded down onto the first and second lateral sections 118, 120. By having the top camera 132 tilted as illustrated in FIG. 1A, the top image data 134 may cover not only a top panel of the package 106, but also part of the side panels such that the top features 158 can be assessed even though folded down onto the side panels as illustrated in FIG. 2, which is in accordance with a commonly known way of folding carton packages, e.g. Tetra Brik™ packages marketed by Tetra Pak™.

The text 146 is in the example illustrated in FIG. 2 depicted as a best before date and a code related to the filling machine identification code. The identification code 152 is exemplified as a code comprising a combination of letters and numbers. As described above, the code may also be provided in the form of a QR code or other two dimensional code or other non-text format.

The cap 185 is in the example illustrated as a combination of a lid provided on a base. The base can be glued onto the package 106. To assure that there is no leakage or misalignment between the base of the cap and the package, a position of the base may form part of the features being assessed in the quality assessment. Having straight edges of the base may provide an advantage since this may facilitate comparisons related to alignment, e.g. assessing if the cap 185 is adequately aligned with edges of the top panel of the package 106.

FIG. 3 illustrates by way of example the bottom portion 104 of the package 106. As the example illustrated in FIG. 2, the package 106 exemplified in FIG. 3 can be the carton package produced by the roll-fed filling machine. Unlike the folding of the top portion 160 illustrated in FIG. 2, the bottom features 164, herein exemplified by bottom flaps, are folded inwards and towards a bottom panel such that the bottom flaps are not visible from a side view of the package 106. In the same way as the folding principle of the top portion is commonly known, this is also the case for the folding of the bottom portion 104 illustrated in FIG. 3. However, an effect of having the bottom features folded inwards is that a quality assessment not taking into account a visual appearance of the bottom portion 104, more particularly the portion of the package 106 being arranged to be in contact with an underlying surface, will not be able to assess the bottom features 164 in the same manner, and potentially less reliable, compared to the package quality inspection station 100 illustrated in FIGS. 1A and 1B.

FIG. 4 is a flowchart illustrating a method 200 for quality inspection of the package 106 using for instance the package quality inspection station 100 illustrated in FIGS. 1A and 1B.

In a first step 202 the package can be conveyed on a first conveyor belt 102. Thereafter, as also described above, the package 106 can in a second step 204 be handed over from the first conveyor belt 102 to the belt brake 112 by transporting the package 106 on the first conveyor belt 102 in combination with the belt brake 112. After the hand-over, in a third step 206, the package 106 can be transported over the gap 110 formed between the first and second conveyor belt 102, 108. While being transported over the gap 110, in a fourth step 208, the top image data 134 can be captured using the top camera 132. Also during the transportation over the gap 110, in a fifth step 210, the bottom image data 138 can be captured using the bottom camera 136. Thereafter, in a sixth step 212, the package 106 can be handed over from the belt brake 112 to the second conveyor belt 108. After the hand-over, in a seventh step 214, the package 106 can be transported by the second conveyor belt 108. In an eighth step 216, the top image data 134 and the bottom image data 138 can be fed to a controller 142, which may comprise a processor and a memory such that the data can be processed. Based on the top image data 134 and the bottom image data 138 in combination, in a ninth step 218, quality issues linked to the package 106 can be identified.

Even though described in a specific order, other orders may also be applied.

From the description above follows that, although various embodiments of the invention have been described and shown, the invention is not restricted thereto, but may also be embodied in other ways within the scope of the subject-matter defined in the following claims.

The invention claimed is:

1. A package quality inspection station comprising
a first conveyor belt arranged to abut a bottom portion of
a package while being conveyed along a transportation
path,
a second conveyor belt arranged to abut the bottom
portion of the package while being conveyed along the
transportation path,
wherein the second conveyor belt is placed at distance
from the first conveyor belt such that a gap is formed,
a belt brake comprising a first and a second lateral belt
arrangement arranged to hold the package via a first
and a second lateral section of the package while being
conveyed along the transportation path,
wherein in a first conveyor section of the transportation
path the package is solely conveyed by the first con-
veyor belt, in a first hand-over section of the transpor-
tation path the package is conveyed by the first con-
veyor belt in combination with the belt brake, in a belt
brake section of the transportation path the package is
conveyed by the belt brake solely, in a second hand-
over section of the transportation path the package is
conveyed by the belt brake in combination with the
second conveyor belt, and in a second conveyor section
of the transportation path the package is solely con-
veyed by the second conveyor belt,
a top camera configured to capture top image data depict-
ing a top portion of the package, wherein the top
camera is placed above the transportation path,
a bottom camera configured to capture bottom image data
depicting the bottom portion of the package, wherein the bottom camera is placed below the belt brake section and in the gap between the first and second conveyor belt, and a controller configured to receive the top image data and the bottom image data and to identify quality issues linked to the package based on the top image data and the bottom image data by correlating a first quality issue associated with the top portion of the package with a second quality issue associated with the bottom portion of the package that is related to the first quality issue.

2. The package quality inspection station according to claim 1, wherein the top camera is placed vertically above the bottom camera.

3. The package quality inspection station according to claim 1, wherein a photocell is provided upstream the top camera or the bottom camera in the transportation path such that the photocell triggers capturing of the top image data using the top camera or capturing of the bottom image data using the bottom camera.

4. The package quality inspection station according to claim 1, wherein the controller comprises a text recognition module configured to transform a text comprised in the top image data into a text data set.

5. The package quality inspection station according to claim 1, wherein the controller further comprises an identification code recognition module configured to transform an identification code depicted in the top image data into an identification data set.

6. The package quality inspection station according to claim 5, wherein the controller further comprises a top forming assessment module configured to assess top features provided on the top portion of the package depicted in the top image data.

7. The package quality inspection station according to claim 6, wherein the controller further comprises a bottom forming assessment module configured to assess bottom features provided on the bottom portion of the package depicted in the bottom image data.

8. The package quality inspection station according to claim 7, wherein the top forming assessment module is configured to feed top features assessment data to the bottom forming assessment module, and the bottom forming assessment module is arranged to assess the bottom features based on the bottom image data in combination with the top features assessment data.

9. The package quality inspection station according to claim 8, wherein the controller further comprises a data communications module configured to transfer the identification data set, the top image data, and the bottom image data of the package to a database on a server, wherein the server is further configured to receive operator features assessment data and the identification data set from an operator panel and to link the operator features assessment data to the top image data and the bottom image data via the identification data set, wherein the operator features assessment data specifies whether or not the package meets features quality requirements with respect to the top features, such that a combination of the top image data, the bottom image data, and the operator features assessment data is used as features training data for an artificial intelligence engine used by the top forming assessment module and/or the bottom forming assessment module.

10. A method for quality inspection of a package, said method comprising:

transporting the package on a first conveyor belt along a transportation path by having the package placed on the first conveyor belt such that a bottom portion of the package is resting on the first conveyor belt, handing over the package from the first conveyor belt to a belt brake, comprising a first and a second lateral belt arrangement, by transporting the package along the transportation path by having the bottom portion resting on the first conveyor belt and a first and a second lateral section of the package interacting with the first and the second lateral belt arrangement, respectively, transporting the package over a gap formed between the first conveyor belt and a second conveyor belt placed downstream the first conveyor belt in the transportation path by having the package interacting with the first and second lateral belt arrangement, capturing top image data depicting a top portion of the package using a top camera during the step of transporting the package over the gap, capturing bottom image data depicting the bottom portion of the package using a bottom camera during the step of transporting the package over the gap, handing over the package from the belt brake to the second conveyor belt by transporting the package along the transportation path by having the bottom portion resting on the second conveyor belt and the first and the second lateral section of the package interacting with the first and the second lateral belt arrangement, respectively, transporting the package on the second conveyor belt along the transportation path by having the package placed on the second conveyor belt such that the bottom portion of the package is resting on the second conveyor belt, feeding the top image data and the bottom image data to a controller, and identifying, using the controller, quality issues linked to the package based on the top image data and the bottom image data by correlating a first quality issue associated with the top portion of the package with a second quality issue associated with the bottom portion of the package that is related to the first quality issue.

11. The package quality inspection station according to claim 1, wherein the first quality issue comprises a first misalignment and the second quality issue comprises a second misalignment, wherein the first misalignment or the second misalignment results in the other of the second misalignment or the first misalignment.

12. The package quality inspection station according to claim 11, wherein the package comprises a carton package formed from a roll-fed packaging machine, such that the carton package being formed with the first misalignment or the second misalignment results in the other of the second misalignment or the first misalignment.

* * * * *